Dec. 21, 1926. 1,611,597
E. LARSSON
LOCKING LINK FOR CHAIN COUPLINGS FOR LOGS
Filed May 19, 1926
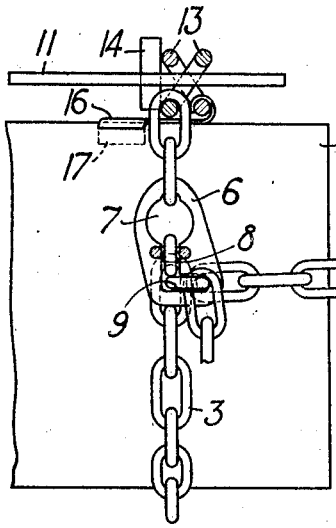
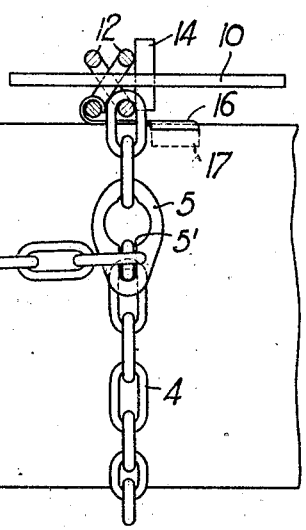
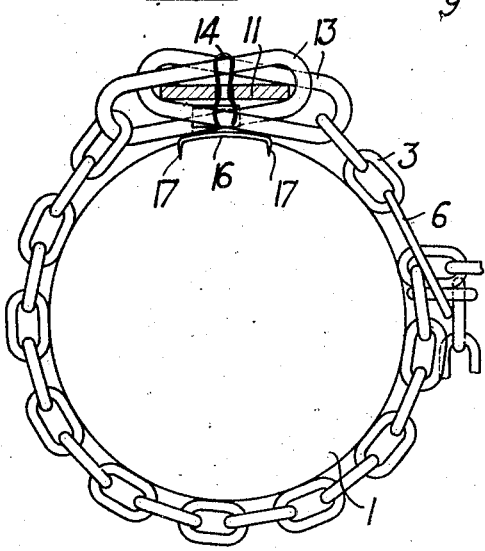
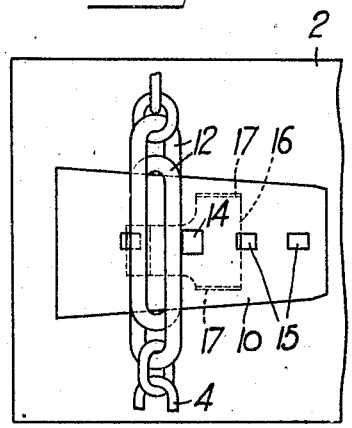
Inventor
Edward Larsson
By Henry Orth Jr.
atty Patented Dec. 21, 1926.

1,611,597

UNITED STATES PATENT OFFICE.

EDWARD LARSSON, OF STOCKHOLM, SWEDEN.

LOCKING LINK FOR CHAIN COUPLINGS FOR LOGS.

Application filed May 19, 1926, Serial No. 110,149, and in Sweden June 2, 1925.

The present invention relates to a locking link for chain couplings for logs and has for its purpose to provide a locking link by which not only a chain laid in well known manner as a loop around a log but also a link of another chain serving to connect the said log to another log can be locked in a simple and quite reliable manner.

The invention consists in the special construction of the locking link more particularly described herebelow and pointed out in the claim.

In the accompanying drawing I have shown one embodiment of my invention.

Fig. 1 shows diagrammatically a side view of two logs connected to each other by a chain.

Fig. 2 shows a slightly modified locking link and two chain links therein shown in section.

Fig. 3 shows an end view of the left hand log of Fig. 1 with the chain thereon, and Fig. 4 shows a top view of the right hand log of Fig. 1 with its chain.

Referring to the drawing, 1 and 2 indicate two logs while 3 and 4 indicate two chains laid as loops around the logs. The loop of the chain 4 is locked by means of a usual locking link 5 and may be tightened by any suitable means, for instance a wedge 10 inserted in two adjacent elongated links 12 of the chain 4 after the same have been pushed together longitudinally as is clearly shown in the drawing. The said wedge 10 may be secured in position by means of a bolt or a U-shaped spring 14 (compare Fig. 3) inserted in one of the holes 15 provided in the wedge 10. To the one of the said elongated links 12 is pivotally secured a plate 16 having edges 17 adapted to be forced into the log 2 in order to prevent the loop of the chain 4 from sliding on the log in the longitudinal direction thereof. The free end of the chain 4 is carried over to the log 1 and locked in a locking link 6 constructed in accordance with the present invention. This link has as usual an aperture 7 through which the chains 3 and 4 used can be pulled and with a locking slot 8 communicating with said aperture 7. Extending from the end of said slot 8 farthest from the said aperture 7 is a slot 9 which forms an angle with the slot 8 and is adapted to receive a link of the chain 4.

The two logs 1 and 2 are coupled together in the following manner. At first the chain 4 is placed as a loop around the log 2 and after the said loop has been locked by inserting one of the links of the chain in the locking slot 5¹ of the locking link 5 the loop is tightened around the log by means of the wedge 10. Then the free end of the chain 4 is carried over to the log 1 where it is inserted through the aperture 7 of the locking link 6 of the chain 3. A link of the chain 4 is thereupon pushed edgewise through the slot 8 into the slot 9 whereupon the chain 3 is laid as a loop around the log 1 and locked by pushing a link thereof into the slot 8 of the locking link 6. The said loop is thereupon tightened by means of any suitable device such as the wedge 11 inserted through two adjacent elongated links 13 of the chain 3.

The slot 9 of the locking link 6 may be of somewhat smaller length than the width of a link of the chain 4 as is shown in Fig. 1 or of approximately the same length as said width as is shown in Fig. 2. In both cases the link of the chain 3 engaging the slot 8 will prevent in a quite reliable manner the link of the chain 4 engaging the slot 9 from leaving the latter as long as the loop of the chain 3 remains tightened around the log 1.

For preventing the loop of the chain 3 from sliding on the log 1 in the longitudinal direction thereof the same device as that described with reference to the chain 4 may be used, viz a plate 16 having edges 17 adapted to be forced into the log 1.

Having now described my invention what I claim is:

A loop chain for logs, having a connecting link provided with an aperture for the free passage of the chain therethrough, and an L-shaped slot communicating at one end with the aperture and forming an extension thereof, the lower closed end portion of said slot being adapted to hold a link of a connecting chain, and the upper communicating portion being adapted to hold a link of the loop chain, whereby a loop chain link maintains a link of the connecting chain in position.

In testimony whereof I have hereunto subscribed my name.

EDWARD LARSSON.